United States Patent
Ayichew et al.

(10) Patent No.: US 10,093,296 B2
(45) Date of Patent: Oct. 9, 2018

(54) ELECTRICALLY ACTIVATED PARK AND EMERGENCY VALVE WITH ON-VALVE MANUAL ACTUATION FEATURE

(71) Applicant: GOODRICH CORPORATION, Charlotte, NC (US)

(72) Inventors: Efrem E. Ayichew, Troy, OH (US); Eric Daniel Cahill, Troy, OH (US); Paul R. Burte, Clayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 98 days.

(21) Appl. No.: 15/415,610

(22) Filed: Jan. 25, 2017

(65) Prior Publication Data

US 2018/0208168 A1    Jul. 26, 2018

(51) Int. Cl.
  *B60T 13/66*  (2006.01)
  *B60T 13/68*  (2006.01)
  *B60T 8/17*   (2006.01)

(52) U.S. Cl.
  CPC .......... *B60T 13/662* (2013.01); *B60T 8/1703* (2013.01); *B60T 13/686* (2013.01)

(58) Field of Classification Search
  CPC ..... B60T 13/662; B60T 8/1703; B60T 13/686
  USPC ..................................................... 303/3, 126
  See application file for complete search history.

(56) References Cited

U.S. PATENT DOCUMENTS

| | | | |
|---|---|---|---|
| 4,360,239 A | 11/1982 | Boehringer | |
| 4,400,039 A * | 8/1983 | Ogata | B60T 11/103 188/16 |
| 4,456,311 A * | 6/1984 | Houtz | B60T 13/16 303/10 |
| 4,572,585 A | 2/1986 | Guichard | |
| 4,976,499 A | 12/1990 | Guichard et al. | |
| 5,044,697 A * | 9/1991 | Longyear | B60T 8/00 244/111 |
| 5,050,939 A * | 9/1991 | Middelhoven | B60T 13/22 188/170 |

(Continued)

FOREIGN PATENT DOCUMENTS

| | | |
|---|---|---|
| EP | 2 974 926 | 1/2016 |
| GB | 2492124 | 12/2012 |

OTHER PUBLICATIONS

European Patent Office, European Search Report, Application No. 18153221.9, dated Jun. 4, 2108, 9 pages.

*Primary Examiner* — Thomas J Williams
*Assistant Examiner* — Mariano Sy

(57) ABSTRACT

A valve includes an electrical park valve configured to receive an electrical park signal and to allow hydraulic fluid to flow through a first electrically-controlled channel in response to the signal indicating a parking request, and a main valve configured to receive the hydraulic fluid from the first electrically-controlled channel and to allow the hydraulic fluid to flow to a braking actuator in response to receiving the hydraulic fluid. The valve also includes an electrical emergency control valve configured to allow the hydraulic fluid to flow through a first control channel in response to a request for emergency braking. The valve also includes an emergency enable valve configured to receive the hydraulic fluid from the first control channel and to allow the hydraulic fluid to flow to the braking actuator in response to receiving the hydraulic fluid from the electrical emergency control valve.

20 Claims, 15 Drawing Sheets

(56) References Cited

U.S. PATENT DOCUMENTS

| | | | |
|---|---|---|---|
| 5,397,173 A | 3/1995 | Bourguet | |
| 6,193,326 B1* | 2/2001 | Ybert | B60T 8/00 |
| | | | 303/126 |
| 7,128,376 B2* | 10/2006 | Williams | B60T 8/1703 |
| | | | 303/15 |
| 9,108,726 B2 | 8/2015 | O'Connell et al. | |
| 9,216,720 B2 | 12/2015 | Cahill | |
| 9,308,900 B2 | 4/2016 | Holzmacher et al. | |
| 2003/0217899 A1* | 11/2003 | Tanaka | B60T 8/26 |
| | | | 188/151 A |
| 2009/0309412 A1* | 12/2009 | Meier | B60T 10/04 |
| | | | 303/3 |
| 2011/0108374 A1 | 5/2011 | Call et al. | |
| 2012/0133200 A1* | 5/2012 | Oyama | B60T 13/12 |
| | | | 303/10 |
| 2012/0286563 A1* | 11/2012 | Lichterfeld | B60T 8/1705 |
| | | | 303/15 |
| 2014/0183935 A1* | 7/2014 | Harrison | B60T 8/1708 |
| | | | 303/14 |
| 2018/0162331 A1* | 6/2018 | Ayichew | B64C 25/44 |

* cited by examiner

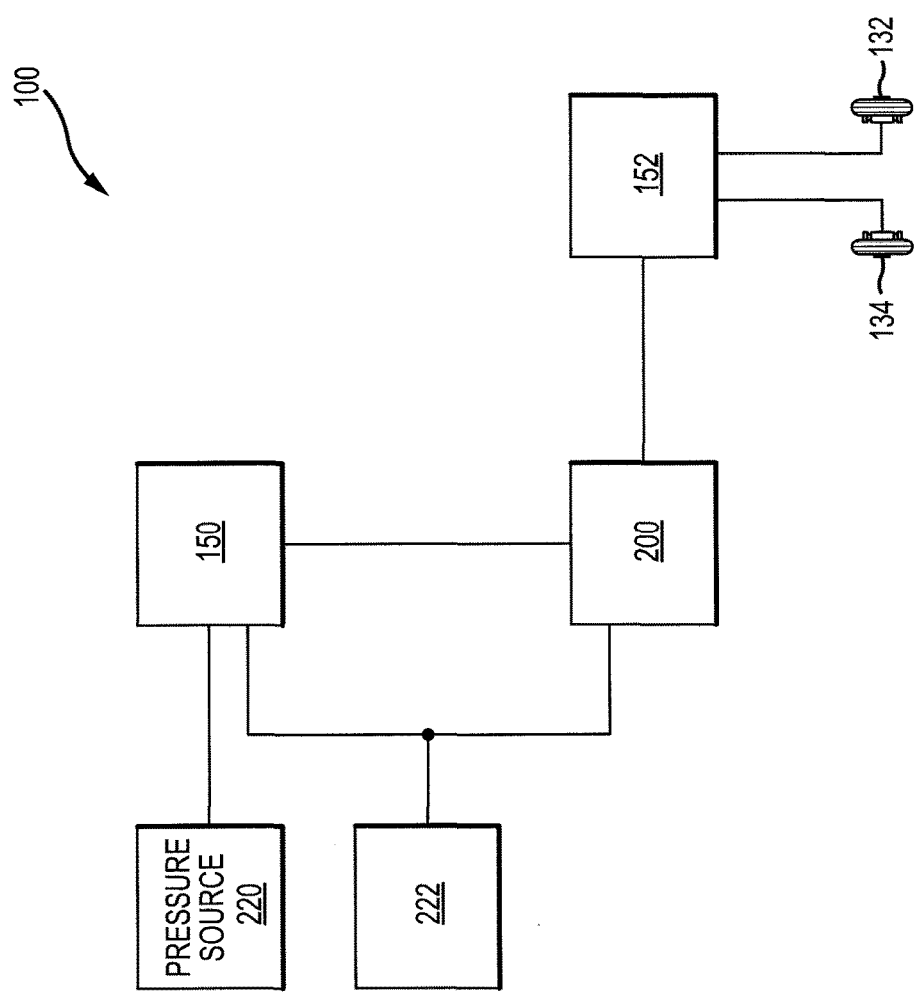

ELECTRICALLY ACTIVATED PARK AND EMERGENCY VALVE WITH ON-VALVE MANUAL ACTUATION FEATURE

FIELD

The present disclosure relates to valves for use in aircraft brakes and, in particular, to a valve used for parking and emergency braking of an aircraft

BACKGROUND

Many aircraft are designed to travel through the air and to also travel along the ground during taxi, takeoff, and landing. In response to an aircraft reaching a final destination upon completion of taxi, it may be desirable to park the aircraft. Likewise, it may be desirable for the aircraft to be capable of emergency braking to provide redundancy for standard braking procedures. In that regard, an aircraft brake may include a valve usable for emergency braking of the aircraft and for parking the aircraft.

SUMMARY

A park and emergency brake valve in accordance with various embodiments includes an electrical park valve configured to receive an electrical park signal and to allow hydraulic fluid to flow through a first electrically-controlled channel in response to the electrical park signal indicating a request to park. The park and emergency brake valve also includes a main valve configured to receive the hydraulic fluid from the first electrically-controlled channel and to allow the hydraulic fluid to flow to a braking actuator in response to receiving the hydraulic fluid from the first electrically-controlled channel. The park and emergency brake valve also includes an electrical emergency control valve configured to receive an emergency brake signal and to allow the hydraulic fluid to flow through a first control channel in response to the emergency brake signal indicating a request for emergency braking. The park and emergency brake valve also includes an emergency enable valve configured to receive the hydraulic fluid from the first control channel of the electrical emergency control valve and to allow the hydraulic fluid to flow to the braking actuator in response to receiving the hydraulic fluid from the electrical emergency control valve.

Any of the foregoing embodiments may also include a manual park valve having an actuation lever and configured to allow the hydraulic fluid to flow through a first manually-controlled channel in response to a first movement of the actuation lever, wherein the main valve is further configured to receive the hydraulic fluid from the first manually-controlled channel and to allow the hydraulic fluid to flow to the braking actuator in response to receiving the hydraulic fluid from the first manually-controlled channel.

In any of the foregoing embodiments, the manual park valve is configured to allow the hydraulic fluid to flow through a second manually-controlled channel in response to a second movement of the actuation lever, and the main valve is further configured to allow the hydraulic fluid to flow from the braking actuator to a return in response to receiving the hydraulic fluid from the second manually-controlled channel.

In any of the foregoing embodiments, the electrical park valve is configured to allow the hydraulic fluid to flow through a second electrically-controlled channel in response to the electrical park signal indicating a request to park disengage, and the main valve is configured to allow the hydraulic fluid to flow from the braking actuator to a return in response to receiving the hydraulic fluid from the second electrically-controlled channel of the electrical park valve.

In any of the foregoing embodiments, the main valve includes a magnet configured to cause the main valve to continue to allow the hydraulic fluid to flow to the braking actuator in response to at least one of: a first reduction of the hydraulic fluid flowing through the first electrically-controlled channel of the electrical park valve, or a second reduction of the hydraulic fluid flowing through the first control channel of the electrical emergency control valve.

In any of the foregoing embodiments, the main valve includes a detent configured to cause the main valve to continue to allow the hydraulic fluid to flow to the braking actuator in response to at least one of: a first reduction of the hydraulic fluid flowing through the first electrically-controlled channel of the electrical park valve, or a second reduction of the hydraulic fluid flowing through the first control channel of the electrical emergency control valve.

In any of the foregoing embodiments, the electrical emergency control valve is further configured to allow the hydraulic fluid to flow through a second control channel in response to the emergency brake signal indicating a request to cease the emergency braking, and the emergency enable valve is further configured to allow the hydraulic fluid to flow from the braking actuator to a return in response to receiving the hydraulic fluid from the second control channel of the electrical emergency control valve.

Any of the foregoing embodiments may also include a brake pressure apply orifice configured to limit a flow of the hydraulic fluid through the emergency enable valve to the braking actuator to a first flow rate.

Any of the foregoing embodiments may also include a brake pressure release orifice configured to limit a flow of the hydraulic fluid through the emergency enable valve to the return to a second flow rate that is greater than the first flow rate.

In any of the foregoing embodiments, the electrical park valve includes a first electrical park valve and a second electrical park valve and the main valve includes a first main valve and a second main valve to provide redundancy of the park and emergency brake valve.

In accordance with various embodiments, a park and emergency brake valve includes a manual park valve having an actuation lever and configured to allow hydraulic fluid to flow through a first manually-controlled channel in response to a first movement of the actuation lever. The park and emergency brake valve further includes a main valve configured to receive the hydraulic fluid from the first manually-controlled channel and to allow the hydraulic fluid to flow to a braking actuator in response to receiving the hydraulic fluid from the first manually-controlled channel. The park and emergency brake valve further includes an electrical emergency control valve configured to receive an emergency brake signal and to allow the hydraulic fluid to flow through a first control channel in response to the emergency brake signal indicating a request for emergency braking. The park and emergency brake valve further includes an emergency enable valve configured to receive the hydraulic fluid from the first control channel of the electrical emergency control valve and to allow the hydraulic fluid to flow to the braking actuator in response to receiving the hydraulic fluid from the electrical emergency control valve.

In any of the foregoing embodiments, the manual park valve is configured to allow the hydraulic fluid to flow through a second manually-controlled channel in response to a second movement of the actuation lever, and the main valve is further configured to allow the hydraulic fluid to flow from the braking actuator to a return in response to receiving the hydraulic fluid from the second manually-controlled channel.

In any of the foregoing embodiments, the main valve includes a magnet configured to cause the main valve to continue to allow the hydraulic fluid to flow to the braking actuator in response to at least one of: a first reduction of the hydraulic fluid flowing through the first manually-controlled channel, or a second reduction of the hydraulic fluid flowing through the first control channel of the electrical emergency control valve.

In any of the foregoing embodiments, the main valve includes a detent configured to cause the main valve to continue to allow the hydraulic fluid to flow to the braking actuator in response to at least one of: a first reduction of the hydraulic fluid flowing through the first manually-controlled channel, or a second reduction of the hydraulic fluid flowing through the first control channel of the electrical emergency control valve.

In any of the foregoing embodiments, the electrical emergency control valve is further configured to allow the hydraulic fluid to flow through a second control channel in response to the emergency brake signal indicating a request to cease the emergency braking, and the emergency enable valve is further configured to allow the hydraulic fluid to flow from the braking actuator to a return in response to receiving the hydraulic fluid from the second control channel of the electrical emergency control valve.

Any of the foregoing embodiments may also include a brake pressure apply orifice configured to limit a flow of the hydraulic fluid through the emergency enable valve to the braking actuator to a first flow rate.

Any of the foregoing embodiments may also include a brake pressure release orifice configured to limit a flow of the hydraulic fluid through the emergency enable valve to the return to a second flow rate that is greater than the first flow rate.

In accordance with various embodiments, a park and emergency brake valve includes a first electrical park valve and a second electrical park valve each configured to receive an electrical park signal and to allow hydraulic fluid to flow through a first electrically-controlled channel in response to the electrical park signal indicating a request to park. The park and emergency brake valve further includes a first manual park valve and a second manual park valve each having an actuation lever and configured to allow the hydraulic fluid to flow through a first manually-controlled channel in response to a first movement of the actuation lever. The park and emergency brake valve further includes a first main valve configured to receive the hydraulic fluid from at least one of the first electrically-controlled channel or the first manually-controlled channel and to allow the hydraulic fluid to flow to a braking actuator in response to receiving the hydraulic fluid from the at least one of the first electrically-controlled channel or the first manually-controlled channel. The park and emergency brake valve further includes an electrical emergency control valve configured to receive an emergency brake signal and to allow the hydraulic fluid to flow through a first control channel in response to the emergency brake signal indicating a request for emergency braking. The park and emergency brake valve further includes an emergency enable valve configured to receive the hydraulic fluid from the first control channel of the electrical emergency control valve and to allow the hydraulic fluid to flow to the braking actuator in response to receiving the hydraulic fluid from the electrical emergency control valve.

In any of the foregoing embodiments, the electrical emergency control valve is further configured to allow the hydraulic fluid to flow through a second control channel in response to the emergency brake signal indicating a request to cease the emergency braking, and the emergency enable valve is further configured to allow the hydraulic fluid to flow from the braking actuator to a return in response to receiving the hydraulic fluid from the second control channel of the electrical emergency control valve.

Any of the foregoing embodiments may also include a brake pressure apply orifice configured to limit a flow of the hydraulic fluid through the emergency enable valve to the braking actuator to a first flow rate, and a brake pressure release orifice configured to limit a flow of the hydraulic fluid through the emergency enable valve to the return to a second flow rate that is greater than the first flow rate.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 1B illustrates a block diagram of an aircraft brake of the aircraft of FIG. 1A, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1A:
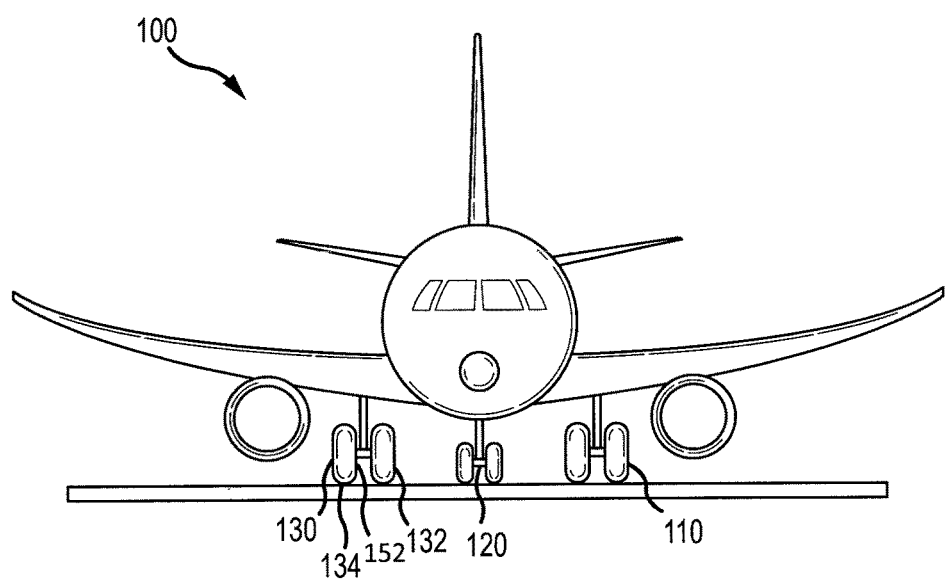
FIG. 1A illustrates an aircraft having multiple landing gear, in accordance with various embodiments.

Referring now to FIG. 1A, an aircraft 100 in accordance with various embodiments can include multiple landing gear including a first landing gear 110, a second landing gear 120, and a third landing gear 130. Each landing gear may include one or more wheel assemblies. For example, the third landing gear 130 includes an inner wheel assembly 132 and an outer wheel assembly 134. Each landing gear 110, 120, 130 and/or each wheel assembly 132, 134 of the aircraft 100 may include a braking actuator 152, such as an aircraft brake. The braking actuator 152 may include multiple valves for performing various functions. For example, the braking actuator 152 may include a park and emergency brake valve for controlling the braking actuator 152 for aircraft parking and for emergency braking.

Turning to FIG. 1B, the aircraft 100 may include a hydraulic pressure source 220 and a hydraulic return 222. The pressure source 220 may provide pressurized hydraulic fluid to a pressure reducing valve 150. The pressure reducing valve 150 may reduce a pressure of the pressurized fluid from a first pressure value to a second pressure value. The hydraulic return 222 may provide hydraulic pressure relief to the pressure reducing valve 150 and a park and emergency brake valve 200. The park and emergency brake valve 200 may control a braking actuator 152 which may, for example, compress rotatable discs coupled to each wheel assembly 132, 134. For example, the park and emergency brake valve 200 may apply pressure to the braking actuator 152 to cause the braking actuator 152 to compress the rotatable discs.

The specification makes reference to various valves. A valve may refer to a valve assembly which may include a valve and a mechanism for controlling the valve, such as a motor, a servo, or another actuator and may include an electrical component for receiving a control signal and for controlling the mechanism for controlling the valve.

Figure 2:
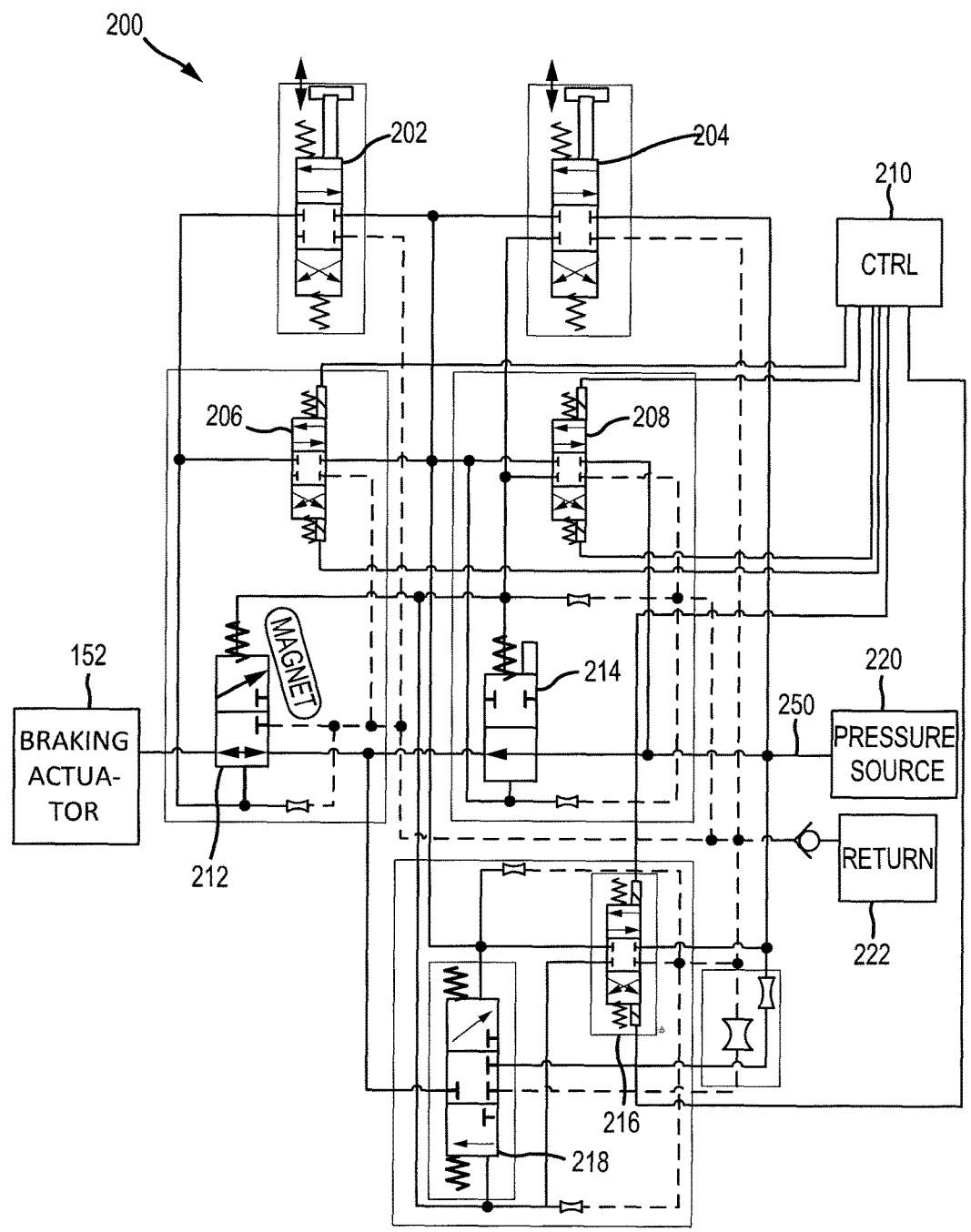
FIG. 2 illustrates a block diagram of a park and emergency brake valve of the aircraft brake of FIG. 1B, in accordance with various embodiments.

Turning now to FIG. 2, a park and emergency brake valve 200 may be used to control the braking actuator 152. The park and emergency brake valve 200 may be a hydraulic system and, thus, may utilize a hydraulic fluid 250 from a pressure source 220. The park and emergency brake valve 200 may be designed to engage the braking actuator 152 for parking purposes via electrical control and via manual control, and may be designed to engage the braking actuator 152 for emergency braking via electrical control. In various embodiments, the park and emergency brake valve 200 may be designed to engage the braking actuator 152 for emergency braking via hydraulic control, such as replacing electric control with hydraulic control, or adding hydraulic control for emergency braking.

In that regard, the park and emergency brake valve 200 may include at least one manual park valve including a first manual park valve 202 and a second manual park valve 204. Each of the manual park valves 202, 204 may be manually controlled to provide hydraulic fluid to the braking actuator 152 for parking purposes.

The park and emergency brake valve 200 may further include at least one electrical park valve including a first electrical park valve 206 and a second electrical park valve 208. Each of the electrical park valves 206, 208 may be electrically controlled to provide hydraulic fluid to the braking actuator 152 for parking purposes.

The park and emergency brake valve 200 may further include at least one main valve including a first main valve 212 and a second main valve 214.

The park and emergency brake valve 200 may further include an electrical emergency control valve 216 and an emergency enable valve 218. The electrical emergency control valve 216 may be electronically controlled, and the emergency enable valve 218 may allow hydraulic fluid to flow to the braking actuator 152 for emergency braking purposes based on actions of the electrical emergency control valve 216.

The park and emergency brake valve 200 may further include a controller 210. In various embodiments, the controller 210 may be positioned within the park and emergency brake valve 200 and, in various embodiments, the controller 210 may be positioned external relative to the park and emergency brake valve 200. The controller may include a processor and a memory. The processor can be a general purpose processor, a PI controller, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof. The memory may be any non-transitory memory capable of storing data. For example, the memory may store instructions to be executed by the processor. The controller 210 may control operation of the electrical park valves 206, 208 and the electrical emergency control valve 216 based on data received from one or more input device, such as input devices positioned within a cockpit of the aircraft 100 of FIG. 1A.

The ability to control the braking actuator 152 based on manual and electrical control provides advantages. For example, the manual park valves 202, 204 may be positioned on an exterior of the aircraft 100 of FIG. 1 such that a maintenance crew may park or park disengage the aircraft 100 without drawing power from the aircraft 100. Likewise, a pilot or copilot may park or park disengage the aircraft 100 using an input device in the cockpit. Furthermore, electrical parking is desirable as it reduces potentially complex cabling of conventional aircraft parking brakes.

The park and emergency brake valve 200 may further include the pressure source 220 and a hydraulic return 222. In various embodiments, one or both of the pressure source 220 or the hydraulic return 222 may be positioned within the park and emergency brake valve 200 and, in various embodiments, one or both of the pressure source 220 or the hydraulic return 222 may be positioned external relative to the park and emergency brake valve 200. The various valves of the park and emergency brake valve 200 may operate based on the hydraulic fluid 250 which may be received from the pressure source 220. In response to a request for one or more valve to reduce pressure at the aircraft braking actuator 152, pressurized fluid may be routed to the hydraulic return 222.

Figures 3A, 3B:
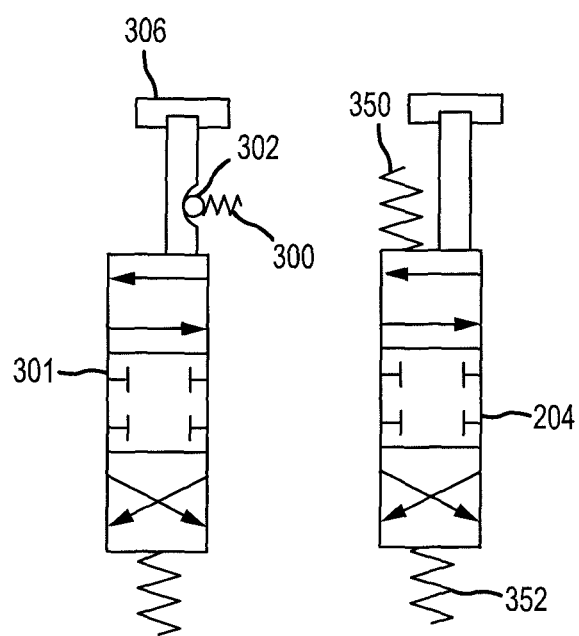
FIGS. 3A and 3B illustrate various features for resisting movement of the actuation levers of the valve of FIG. 2 in response to vibration, in accordance with various embodiments.

Referring now to FIG. 3A, it may be undesirable for a manual park valve 301 to change settings in response to vibration experienced by the manual park valve 301. In that regard, the manual park valve 301 may include an actuation lever 306 that is used to set a desired position of the manual park valve 301. It is undesirable for the actuation lever 306 to change position in response to vibration. In that regard, the actuation lever 306 may include a detent 302 for resisting movement of the actuation lever 306 in response to vibration. A spring 300 or other feature may be received by the detent 302. The features of the manual park valve 301 may be used in either or both of the first manual park valve 202 or the second manual park valve 204.

Turning now to FIG. 3B, the second manual park valve 204 may include a first control spring 350 and a second control spring 352. The control springs 350, 352 may operate together to resist movement of the second manual park valve 204 in response to vibration of the second manual park valve 204. In various embodiments, additional or alternative features may be used instead of a detent or control springs to resist movement of a manual park valve in response to vibration. The features of the second manual park valve 204 may be used in either or both of the first manual park valve 202 or the second manual park valve 204.

Figure 4:
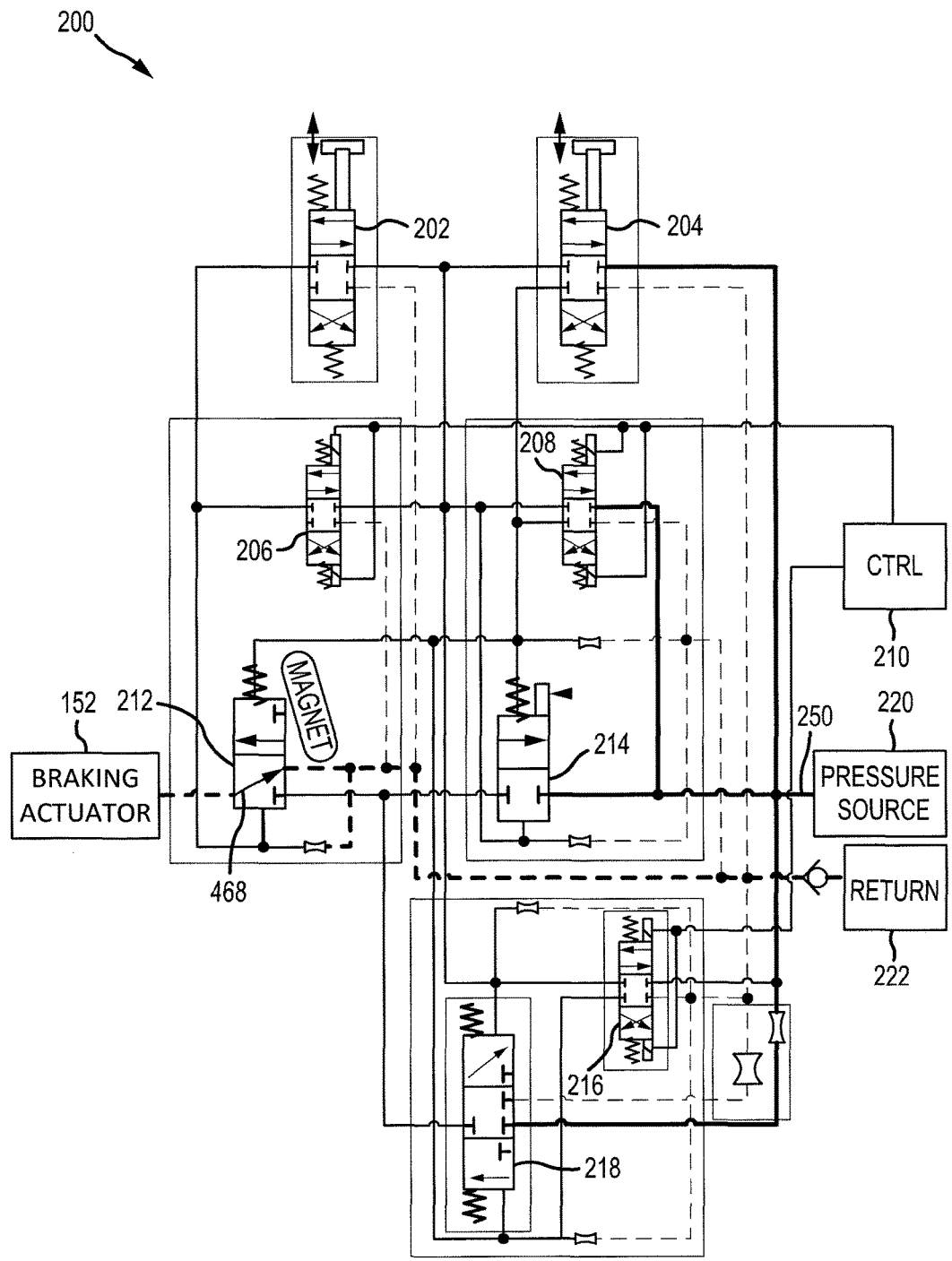
FIG. 4 illustrates the valve of FIG. 2 during a non-parking and nonemergency braking state, in accordance with various embodiments.

Turning now to FIG. 4, the park and emergency brake valve 200 may be in a steady state in response to a lack of request for parking or emergency braking. The park and emergency brake valve 200 may be in such state in response to an absence of a park request via the manual park valves 202, 204, an absence of a park request from the controller 210, and an absence of a braking request from the controller 210. In that regard, the hydraulic fluid 250 from the pressure source 220 may not flow through any of the manual park valves 202, 204, the electrical park valves 206, 208, the main valves 212, 214, the electrical emergency control valve 216, and the emergency enable valve 218. However, the first main valve 212 may be configured such that hydraulic fluid may flow from the braking actuator 152 through a second main channel 468 towards the hydraulic return 222.

Figure 5:
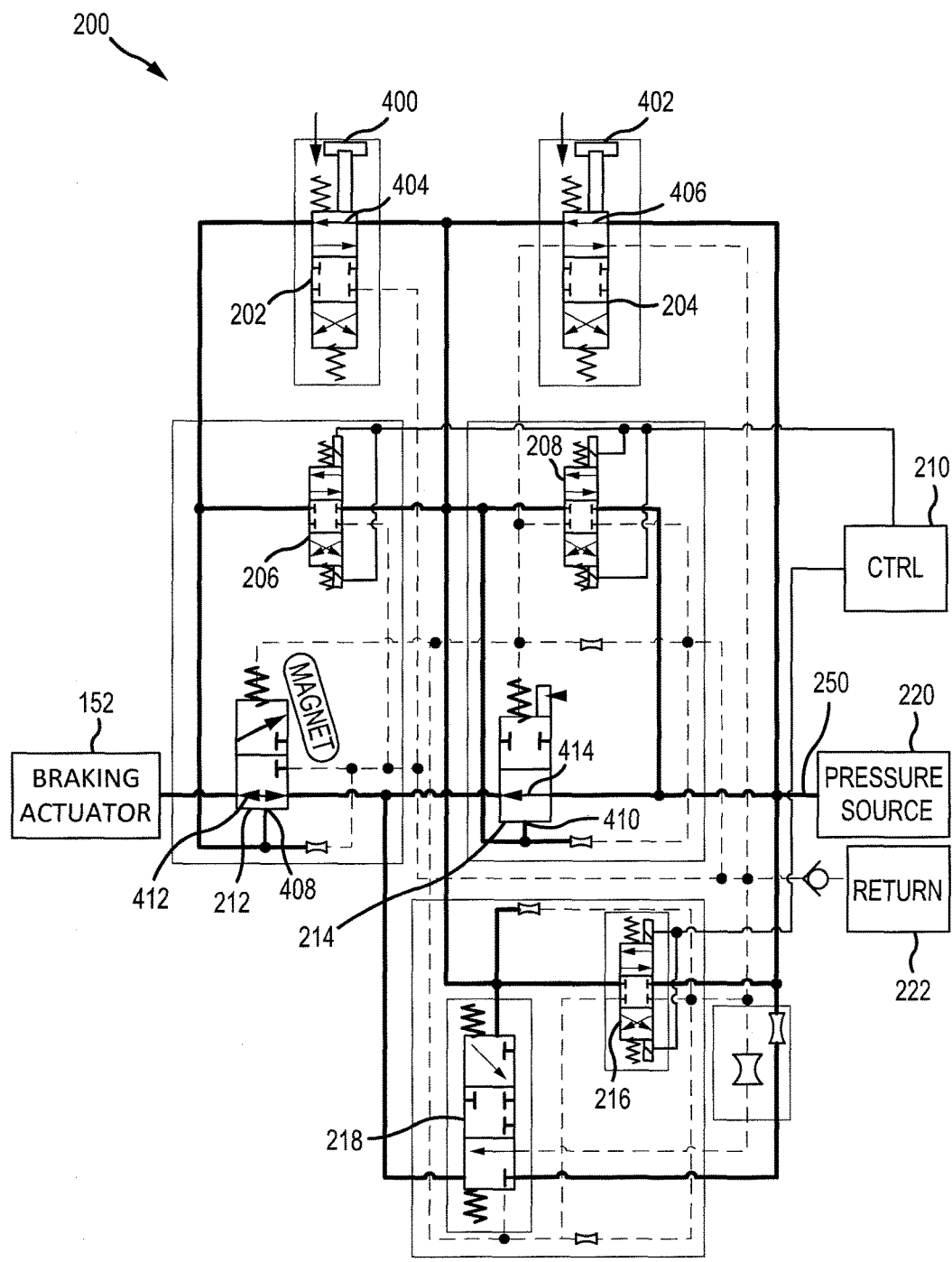
FIG. 5 illustrates the valve of FIG. 2 responding to a manual parking request, in accordance with various embodiments.

Turning now to FIG. 5, manual parking of the braking actuator 152 via the park and emergency brake valve 200 is requested. In particular, a first actuation lever 400 of the first manual park valve 202 and a second actuation lever 402 of the second manual park valve 204 may be manually actuated, or subjected, to a first movement, to a park request position. As shown, the actuation levers 400, 402 may be actuated downward (i.e., towards the electrical park valves 206, 208). In response to such downward actuation of the actuation levers 400, 402, hydraulic fluid 250 from the pressure source 220 may flow through the first manual park valve 202 and the second manual park valve 204 via first manually-controlled channels 404, 406 of the manual park valves 202, 204, respectively.

In response to the hydraulic fluid flowing through the manual park valves 202, 204, the hydraulic fluid 250 may flow to a first location 408 of the first main valve 212 and a first location 410 of the second main valve 214. The first main valve 212 and the second main valve 214 may actuate in response to receiving the hydraulic fluid from the manual park valves 202, 204. In particular, the main valves 212, 214 may actuate (i.e., towards the manual park valves 202, 204) in response to receiving the hydraulic fluid.

In response to such actuation of the main valves 212, 214, hydraulic fluid 250 from the pressure source 220 may flow through a first main channel 412 of the first main valve 212 and a first main channel 414 of the second main valve 214. The hydraulic fluid 250 that flows through the first main channels 412, 414 may be received by the braking actuator 152 for parking.

As shown, the controller 210 may not request parking via the electrical park valves 206, 208 and may not request emergency braking via the electrical emergency control valve 216. Accordingly, the hydraulic fluid 250 may not flow through the electrical park valves 206, 208, may not flow through the electrical emergency control valve 216, and may not flow through the emergency enable valve 218. Furthermore, the hydraulic fluid 250 may not flow to the hydraulic return 222.

Figure 6:
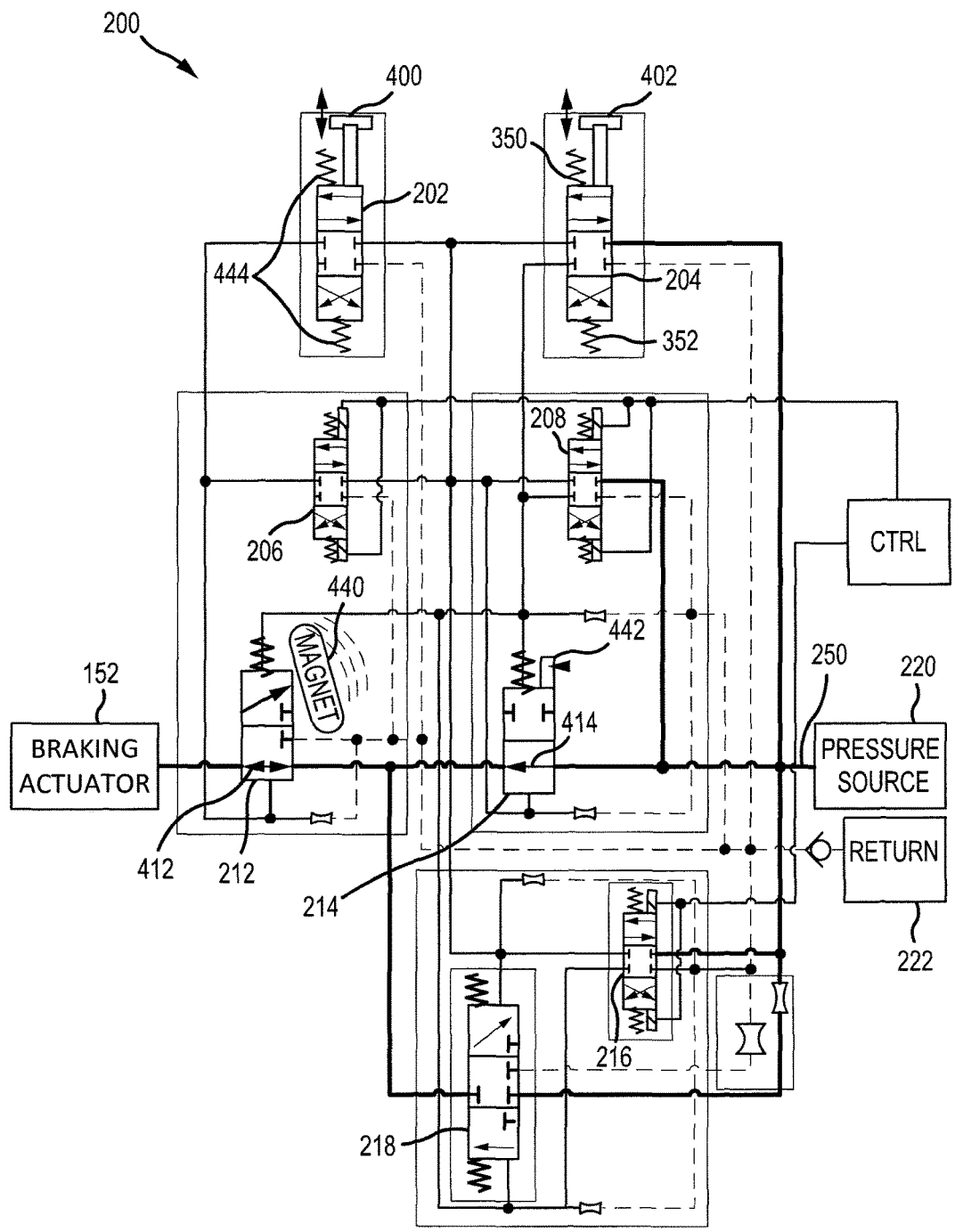
FIG. 6 illustrates the valve of FIG. 2 responding to release of the manual parking request of FIG. 5, in accordance with various embodiments.

Turning now to FIG. 6, the park and emergency brake valve 200 may continue to supply the pressurized hydraulic fluid 250 from the pressure source 220 to the braking actuator 152 in response to release of the actuation levers 400, 402. Stated differently, in response to a first reduction of the hydraulic fluid 250 flowing through the manual park valves 202, 204, the park and emergency brake valve 200 may continue to supply the pressurized hydraulic fluid 250 to the braking actuator 152.

In response to the actuation levers 400, 402 being released, the control springs 444 of the first manual park valve 202 and the control springs 350, 352 of the second manual park valve 204 may cause the corresponding actuation levers 400, 402 to return to their pre-actuation state. In that regard, the hydraulic fluid 250 may no longer flow through the manual park valves 202, 204. Similarly, the hydraulic fluid 250 may not flow through the electrical park valves 206, 208, the electrical emergency control valve 216, and the emergency enable valve 218.

The first main valve 212 may include a magnet 440, and the second main valve 214 may include a detent 442. The magnet 440 may resist movement of the first main valve 212 in response to a lack of pressurized hydraulic fluid from either of the manual park valves 202, 204. Likewise, the detent 442 may resist movement of the second main valve 214 in response to a lack of pressurized hydraulic fluid from either of the manual park valves 202, 204. Stated differently, the detent 442 may allow the hydraulic fluid 250 to continue to flow through the second main valve 214 in response to a first reduction of hydraulic fluid 250 through the manual park valves 202, 204 and/or in response to a second reduction of hydraulic fluid 250 through the electrical park valves 206, 208. In that regard, the hydraulic fluid 250 may continue to flow from the pressure source 220 to the braking actuator 152 via the first main channels 412, 414.

In response to the park and emergency brake valve 200 being in the state illustrated in FIG. 6, hydraulic fluid may not flow to the hydraulic return 222. In various embodiments, the park and emergency brake valve 200 may remain in the illustrated state until at least one of a signal is received by either electrical park valve 206, 208 or the electrical emergency control valve 216.

In various embodiments, each of the main valves 212, 214 may include at least one of a magnet, a detent, or other feature capable of causing the corresponding main valve 212, 214 to remain in the state in which the hydraulic fluid 250 may flow from the pressure source 220 to the braking actuator 152 via the first main channels 412, 414.

Figure 7:
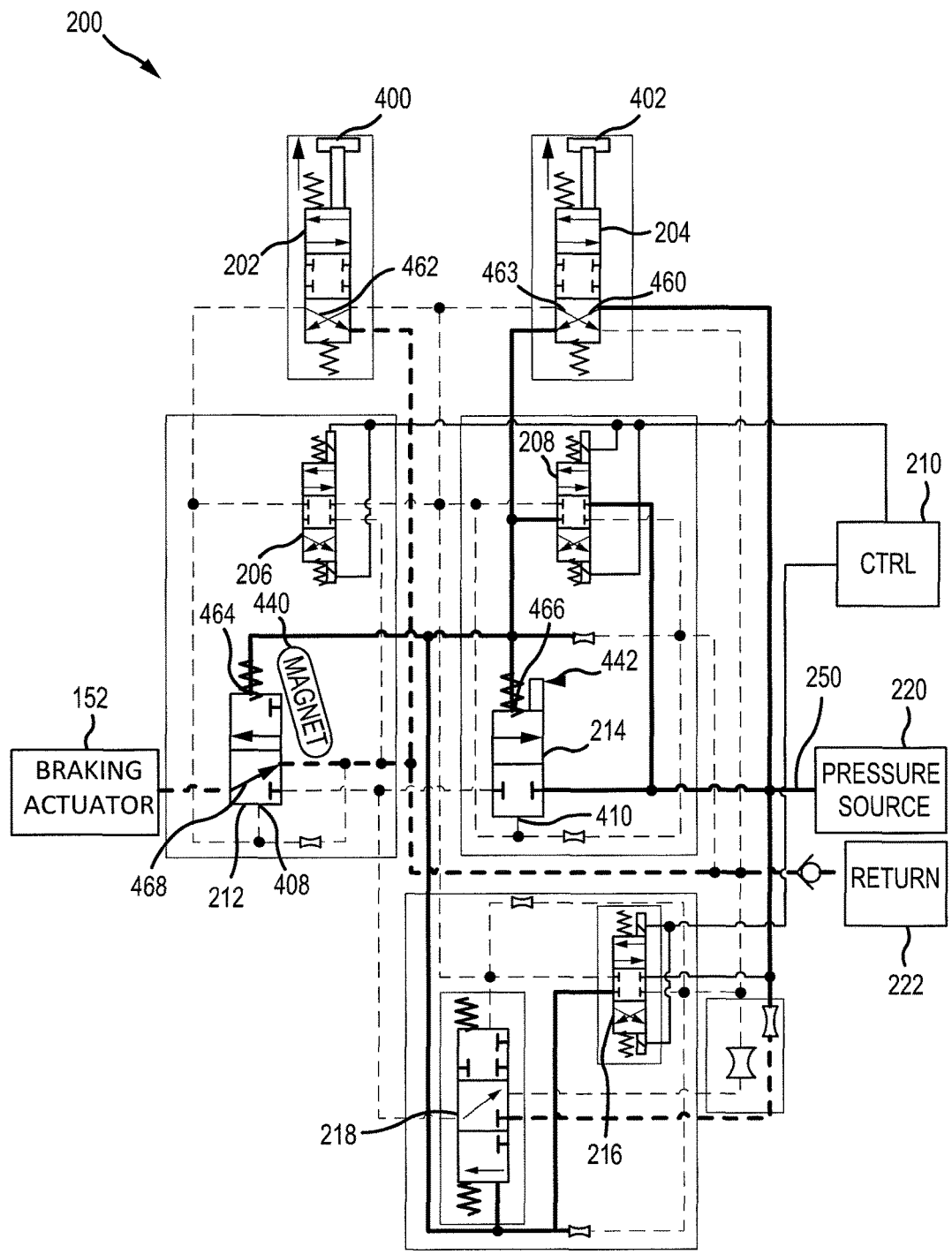
FIG. 7 illustrates the valve of FIG. 2 responding to a manual park disengage request, in accordance with various embodiments.

Turning now to FIG. 7, the actuation levers 400, 402 may be utilized to cause the park and emergency brake valve 200 to cause the braking actuator 152 to park disengage. In particular, the actuation levers 400, 402 may be actuated in a particular manner (i.e., subjected to a second movement) that corresponds to a request to park disengage. As shown in the embodiment of FIG. 7, the actuation levers 400, 402 may be actuated upwards (i.e., away from the electrical park valves 206, 208).

In response to such actuation of the actuation levers 400, 402, the hydraulic fluid 250 may flow from the pressure source 220 through a second manually-controlled channel 460 of the second manual park valve 204. The hydraulic fluid 250 may flow through the second manually-controlled channel 460 and be received at a second location 464 of the first main valve 212 and a second location 466 of the second main valve 214.

In response to the hydraulic fluid 250 being received at the second locations 464, 466, each of the main valves 212, 214 may be actuated to change states. In the embodiment illustrated in FIG. 7, the main valves 212, 214 may be actuated downwards (i.e., away from the manual park valves 202, 204) in response to receiving the hydraulic fluid 250 from the second manually-controlled channel 460.

In response to being actuated in this manner, the first main valve 212 may be positioned such that the hydraulic fluid 250 from the braking actuator 152 may flow through a second main channel 468 of the first main valve 212 towards the hydraulic return 222. Such flow of the hydraulic fluid 250 from the braking actuator 152 to the hydraulic return 222 reduces a pressure received by the braking actuator 152, thus converting the braking actuator 152 from a parked state to a park disengageed state.

Likewise, in response to the actuation levers 400, 402 being raised, hydraulic fluid 250 from the first locations 408, 410 of the main valves 212, 214 may flow through third manually-controlled channels 462, 463 of the manual park valves 202, 204 to the hydraulic return 222.

In various embodiments, the magnet 440 and the detent 442 may cause the main valves 212, 214 to remain in the state shown in FIG. 7. In that regard, the hydraulic fluid 250 may continue to flow from the braking actuator 152 to the hydraulic return 222 in response to release of the actuation levers 400, 402.

In response to the park and emergency brake valve 200 being in the state illustrated in FIG. 7, the hydraulic fluid 250 may not flow through the second main valve 214, the electrical park valves 206, 208, the electrical emergency control valve 216, and the emergency enable valve 218. Furthermore, the controller 210 may not control the electrical park valves 206, 208 and the electrical emergency control valve 216.

Figure 8:
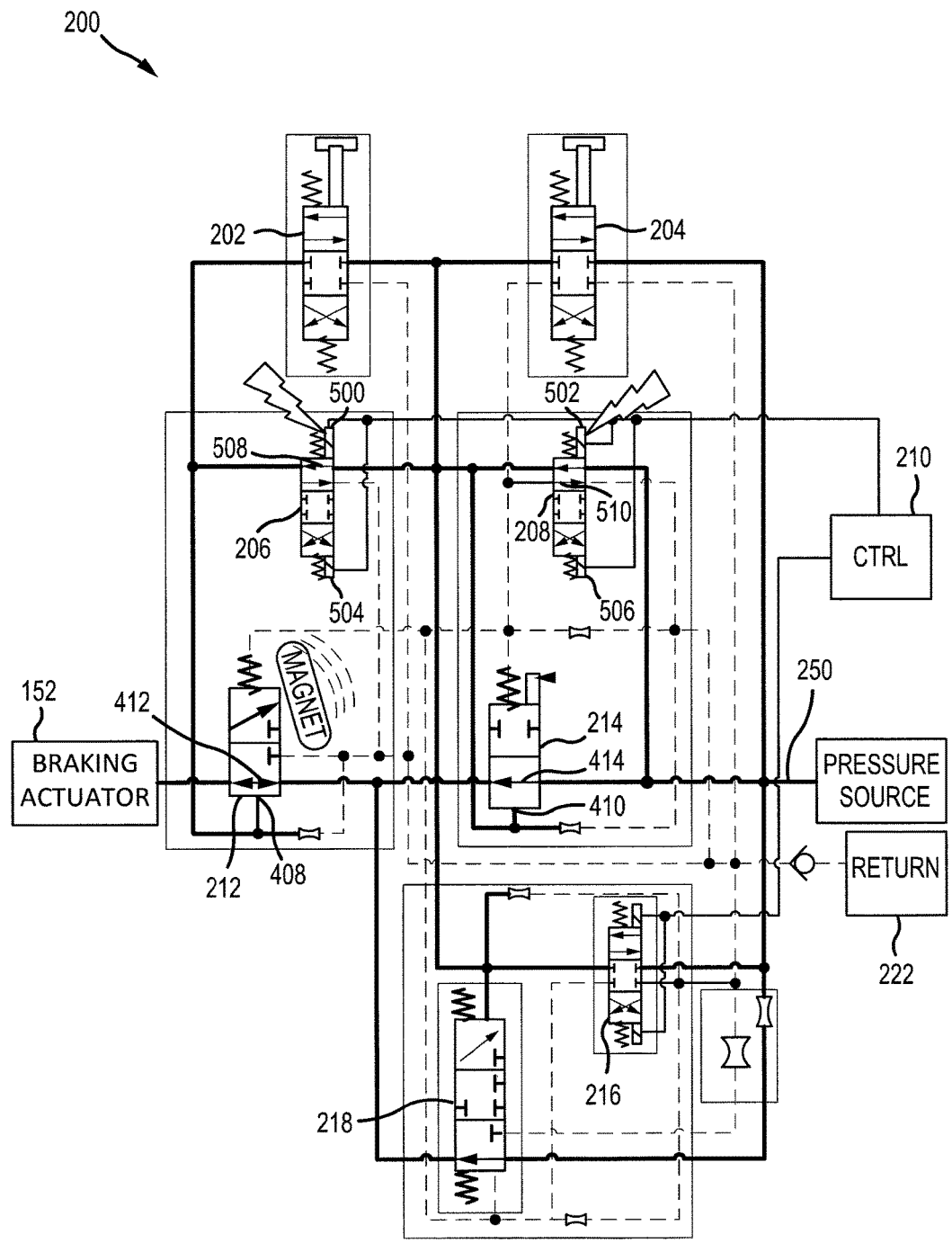
FIG. 8 illustrates the valve of FIG. 2 responding to an electrical park request, in accordance with various embodiments.

Turning now to FIG. 8, the controller 210 may cause the park and emergency brake valve 200 to apply pressure to the braking actuator 152. In particular, the first electrical park valve 206 includes a first actuator 500 and a second actuator 504, and the second electrical park valve 208 includes a first actuator 502 and a second actuator 506. The controller 210 may be coupled to each of the actuators 500, 502, 504, 506.

In order to electronically control the braking actuator 152 to park, an input signal may be received by the controller 210. For example, the input signal may be an electrical park signal and may indicate a request to park or a request to park disengage.

In response to receiving the request to park, the controller 210 may control the first actuator 500, 502 of the electrical park valves 206, 208. In particular, the controller 210 may control the actuators 500, 502 to actuate the electrical park valves 206, 208 into a state in which the hydraulic fluid 250 may flow through a first electrically-controlled channel 508 of the first electrical park valve 206 and a first electrically-controlled channel 510 of the second electrical park valve 208.

In response to the hydraulic fluid 250 flowing through the first electrically-controlled channels 508, 510, the hydraulic fluid 250 may be received at the first locations 408, 410 of the first main valve 212 and the second main valve 214, respectively. The main valves 212, 214 may then allow the hydraulic fluid 250 flow through the first main channels 412, 414 to the braking actuator 152.

In response to the park and emergency brake valve 200 being in the state shown in FIG. 8, hydraulic fluid may not flow through the manual park valves 202, 204, the electrical emergency control valve 216, and the emergency enable valve 218. Likewise, the hydraulic fluid 250 may not flow to the hydraulic return 222.

With reference to FIGS. 6 and 8, in response to the controller 210 no longer applying the electrical park signal that indicates the request to park, the park and emergency brake valve 200 may remain in the state illustrated in FIG. 6.

Figure 9:
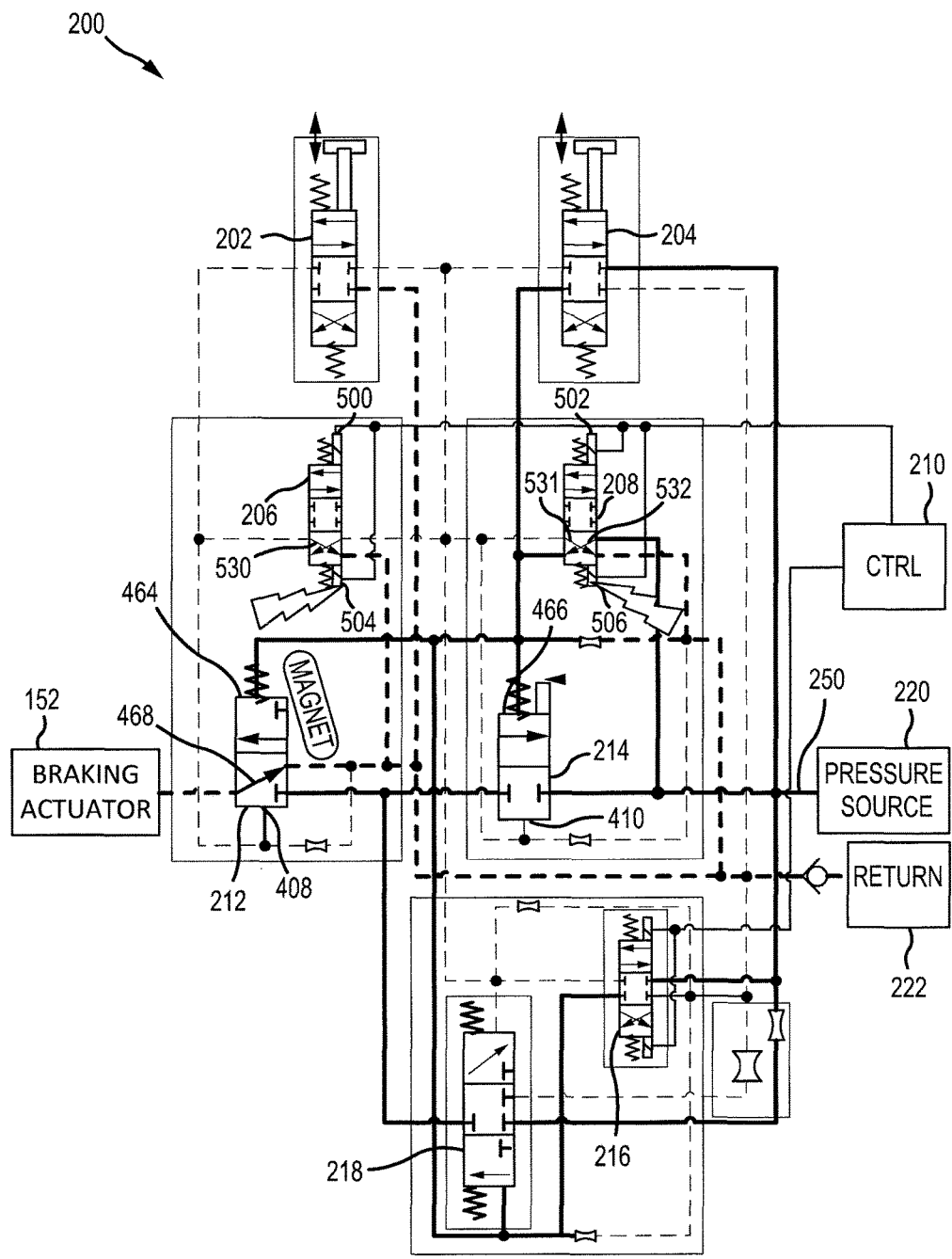
FIG. 9 illustrates the valve of FIG. 2 responding to an electrical park disengage request, in accordance with various embodiments.

Turning to FIG. 9 and in response to the controller 210 receiving a request to electrically park disengage, the controller 210 may control the second actuators 504, 506 to actuate the electrical park valves 206, 208. In response to such actuation, the hydraulic fluid 250 may flow from the pressure source 220 through a second electrically-controlled channel 532 of the second electrical park valve 208. The hydraulic fluid 250 may flow through the second electrically-controlled channel 532 and be received by the second locations 464, 466 of the main valves 212, 214.

As discussed above with reference to FIG. 7, in response to the hydraulic fluid being received by the second locations 464, 466, pressurized fluid from the braking actuator 152 may flow through the second main channel 468 of the first main valve 212 to the hydraulic return 222. Likewise, in response to the first electrical park valve 206 being actuated via the second actuator 504, pressurized hydraulic fluid from the first locations 408, 410 may flow through third electrically-controlled channels 530, 531 of the electrical park valves 206, 208, respectively, to the hydraulic return 222.

Figure 10:
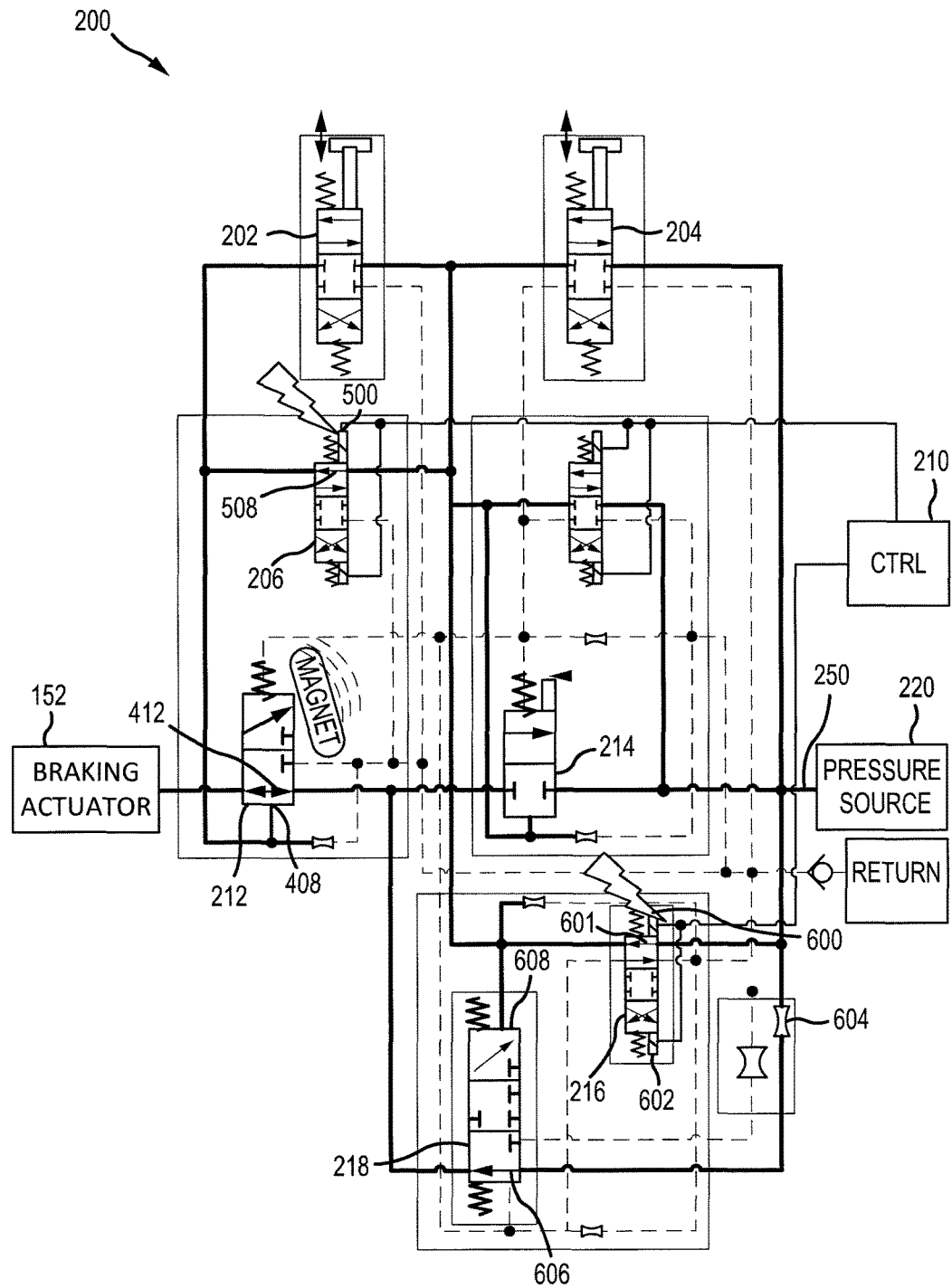
FIG. 10 illustrates the valve of FIG. 2 in response to an electrical request to enable emergency braking, in accordance with various embodiments.

Turning to FIG. 10, the park and emergency brake valve 200 may be used for emergency braking. In that regard, the electrical emergency control valve 216 may include a first actuator 600 and a second actuator 602 each coupled to the controller 210. In order to enable emergency braking, the controller 210 may transmit a signal (i.e., an emergency brake signal) to the first actuator 600 of the electrical emergency control valve 216 and the first actuator 500 of the first electrical park valve 206.

The first actuator 600 of the electrical emergency control valve 216 may actuate the electrical emergency control valve 216 downward (i.e., away from the manual control valves 202, 204), allowing the hydraulic fluid 250 to flow through a first control channel 601 of the electrical emergency control valve 216. The hydraulic fluid may flow through the first control channel 601 and the first electrically-controlled channel 508 where it may be received at the first location 408 of the first main valve 212.

Likewise, the hydraulic fluid that flows through the first control channel 601 may be received at a first location 608 of the emergency enable valve 218. In response to the first location 608 receiving the hydraulic fluid 250, the emergency enable valve 218 may be actuated to a position in which the hydraulic fluid 250 from the pressure source 220 may flow through a first enable channel 606.

In response to the hydraulic fluid 250 being received at the first location 408, the first main valve 212 may be actuated upwards (i.e., towards the manual park valves 202, 204), allowing the hydraulic fluid that flows to the first enable channel 606 to flow through the first main channel 412 to the braking actuator 152. In that regard, the pressurized hydraulic fluid 250 may be received by the braking actuator 152 for braking purposes.

The park and emergency brake valve 200 may further include a brake pressure apply orifice 604. The hydraulic fluid 250 that flows through the first enable channel 606 also flows through the brake pressure apply orifice 604. The brake pressure apply orifice 604 limits a flow of the hydraulic fluid through the first enable channel 606 to a relatively low flow rate. In that regard, the braking actuator 152 may become pressurized relatively slowly, reducing the likelihood of damage to tires of the aircraft 100 of FIG. 1.

Figure 11:
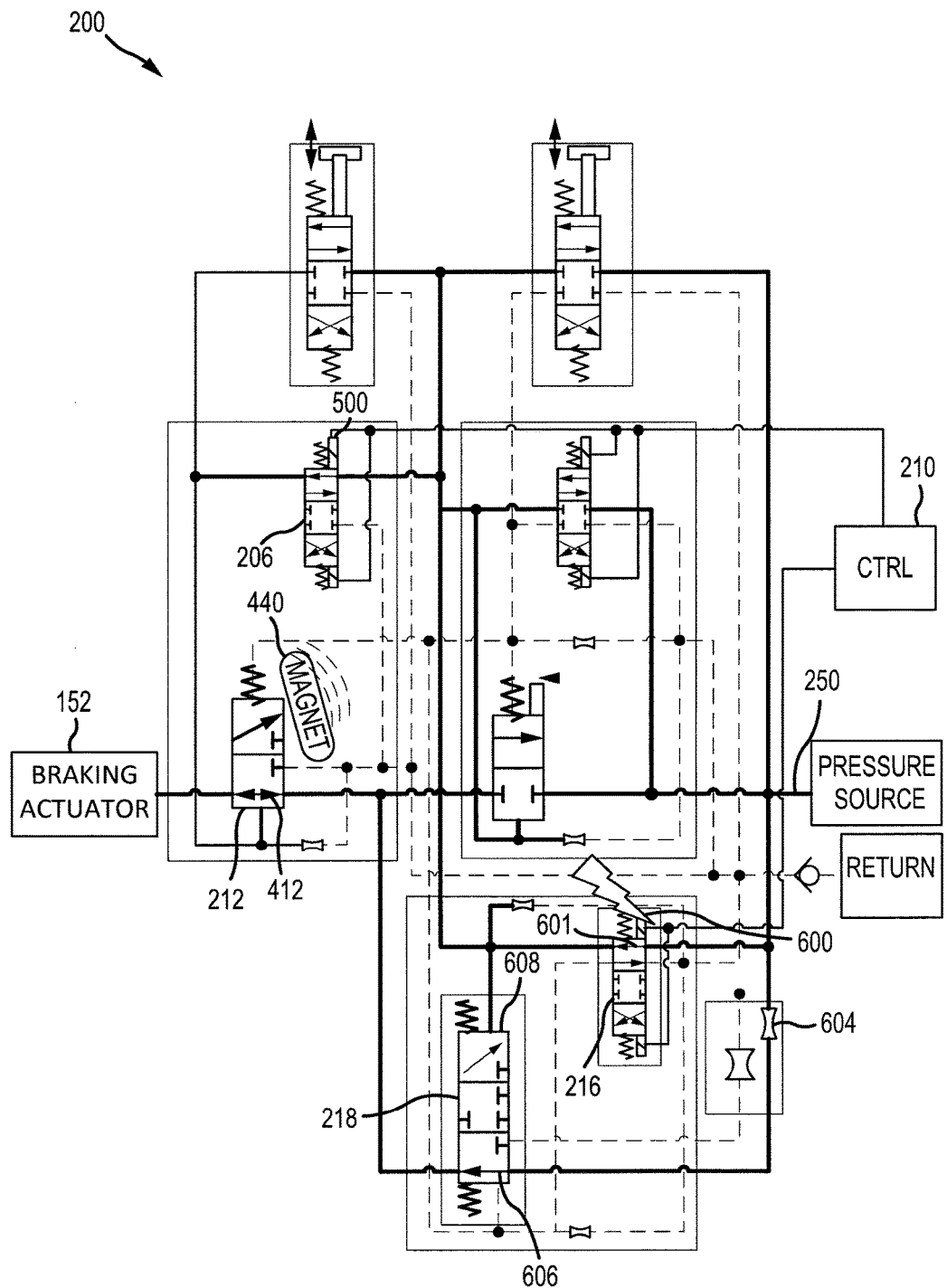
FIG. 11 illustrates the valve of FIG. 2 in response to an electrical request to apply emergency braking, in accordance with various embodiments.

Turning now to FIG. 11, the controller 210 may cease controlling the first actuator 500 of the first electrical park valve 206. In that regard, the magnet 440 may cause the first main valve 212 to remain in the state such that the hydraulic fluid 250 may continue to flow through the first main channel 412. Thus, the controller 210 may cause emergency braking to continue by continuing to control the first actuator 600 of the electrical emergency control valve 216. In that regard, the hydraulic fluid 250 may continue to flow through the first control channel 601, where it is received at the first location 608 of the emergency enable valve 218. Accordingly, the emergency enable valve 218 remains in the state in which the hydraulic fluid may flow through the brake pressure apply orifice 604 through the first enable channel 606 where it may flow through the first main channel 412 to the braking actuator 152.

Figure 12:
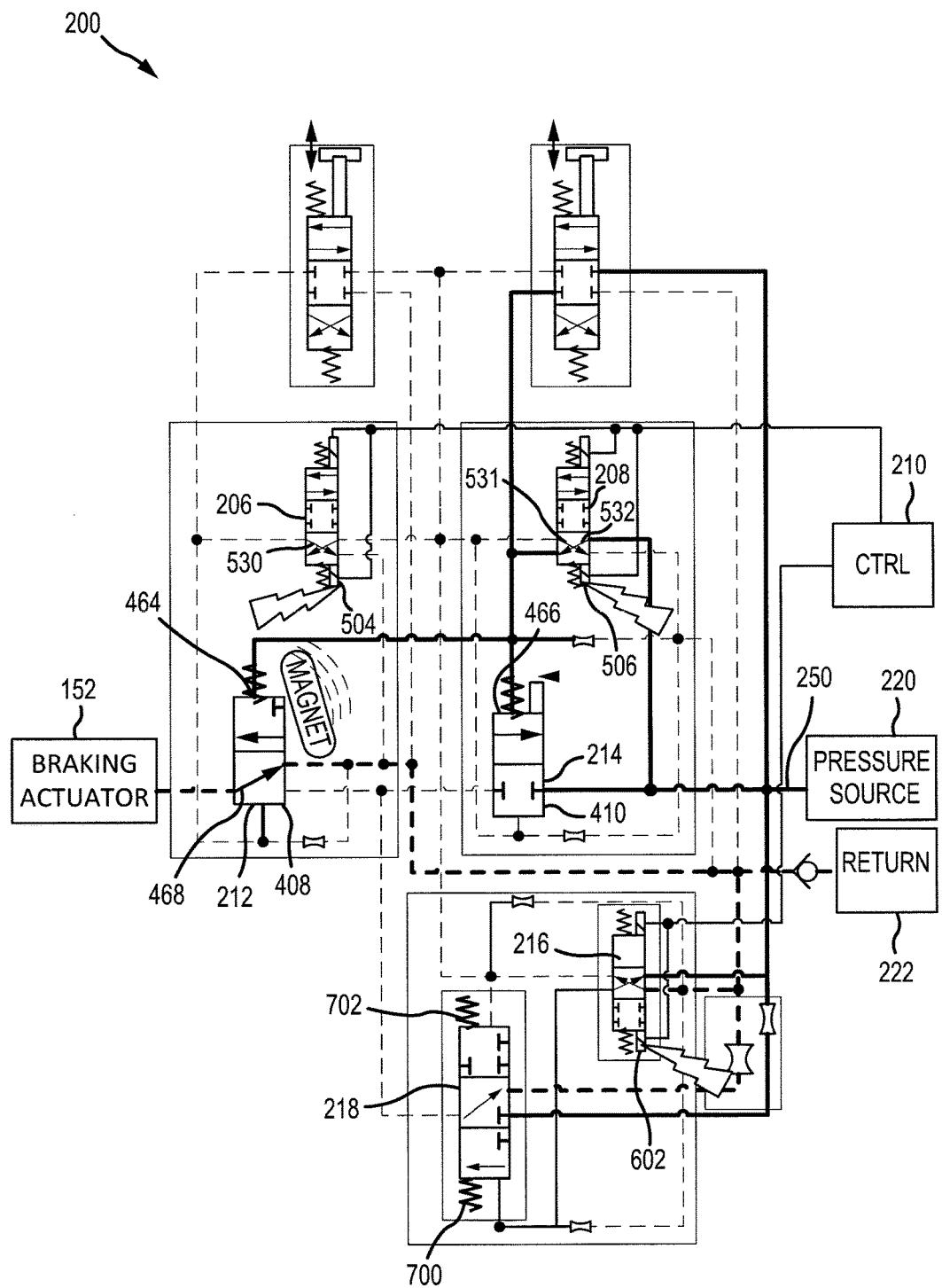
FIG. 12 illustrates the valve of FIG. 2 in response to an electrical request to exit the emergency braking, in accordance with various embodiments.

Turning now to FIG. 12, the controller 210 may control the park and emergency brake valve 200 to exit the emergency brake state. In order to exit the emergency brake state, the controller 210 may control the second actuators 504, 506 of the electrical park valves 206, 208. In response to actuation of the second actuator 506, the second electrical park valve 208 may be actuated to allow the hydraulic fluid 250 from the pressure source 220 to flow through the second electrically-controlled channel 532 towards the second side 464, 466 of the main valves 212, 214. In that regard, the first main valve 212 is configured such that the hydraulic fluid may flow from the braking actuator 152 through the second main channel 468 to the hydraulic return 222. Likewise, the hydraulic fluid from the first locations 408, 410 of the main valves 212, 214 may flow through the third electrically-controlled channels 530, 531 to the hydraulic return 222.

The controller 210 may also control the second actuator 602 of the electrical emergency control valve 216. In that regard, the electrical emergency control valve 216 may be oriented such that the hydraulic fluid 250 may no longer flow to the emergency enable valve 218. In that regard, control springs 700, 702 of the emergency enable valve 218 may cause the emergency enable valve 218 to return to a state in which fluid may not flow therethrough.

Figure 13:
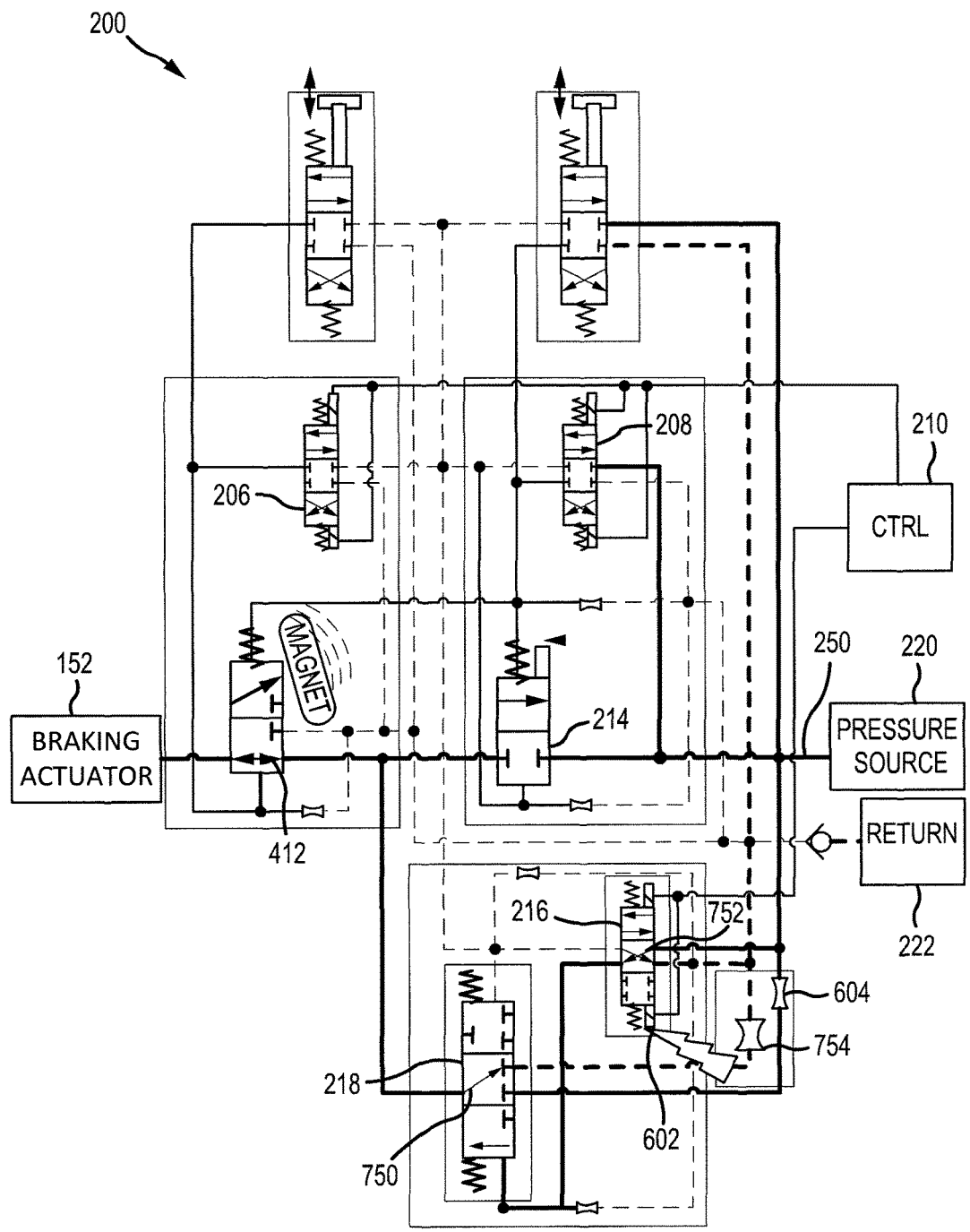
FIG. 13 illustrates the valve of FIG. 2 in response to an electrical request to release emergency braking, in accordance with various embodiments.

Turning to FIG. 13, in various embodiments, it may be desirable to reduce pressure received by the braking actuator 152 relatively gradually. For example, the controller 210 may control the braking actuator 152 to apply a desired amount of braking force by controlling the pressure received by the braking actuator 152 by increasing and decreasing the pressure received by the braking actuator 152 using the electrical emergency control valve 216.

In order to reduce the pressure received by the braking actuator 152, the controller 210 may control the second actuator 602 of the electrical emergency control valve 216 to actuate such that hydraulic fluid 250 from the pressure source 220 may flow through a second control channel 752. In response to the hydraulic fluid 250 flowing through the second control channel 752, the emergency enable valve 218 may be actuated such that hydraulic fluid may flow from the braking actuator 152 through the first main channel 412 and through a second enable channel 750 of the emergency enable valve 218 to the hydraulic return 222. For example, the pressure applied by the hydraulic fluid 250 that flows through the second control channel 752 exerts a force on the emergency enable valve 218, thus actuating the emergency enable valve 218.

The hydraulic fluid flowing through the second enable channel 750 to the hydraulic return 222 also flows through a brake pressure release orifice 754. The brake pressure release orifice 754 limits a rate of flow of the hydraulic fluid therethrough to a predetermined flow rate. In various embodiments, the brake pressure release orifice 754 allows the hydraulic fluid to flow therethrough at a rate that is greater than a rate of flow allowed by the brake pressure apply orifice 604. In various embodiments, it may be desirable to allow the pressure experienced at the braking actuator 152 to be reduced at a rate that is greater than a rate at which the pressure increases. Stated differently, the hydraulic fluid 250 may flow through the brake pressure apply orifice 604 at a first flow rate and may flow through the brake pressure release orifice 754 at a second flow rate that is greater than the first flow rate.

Figure 14:
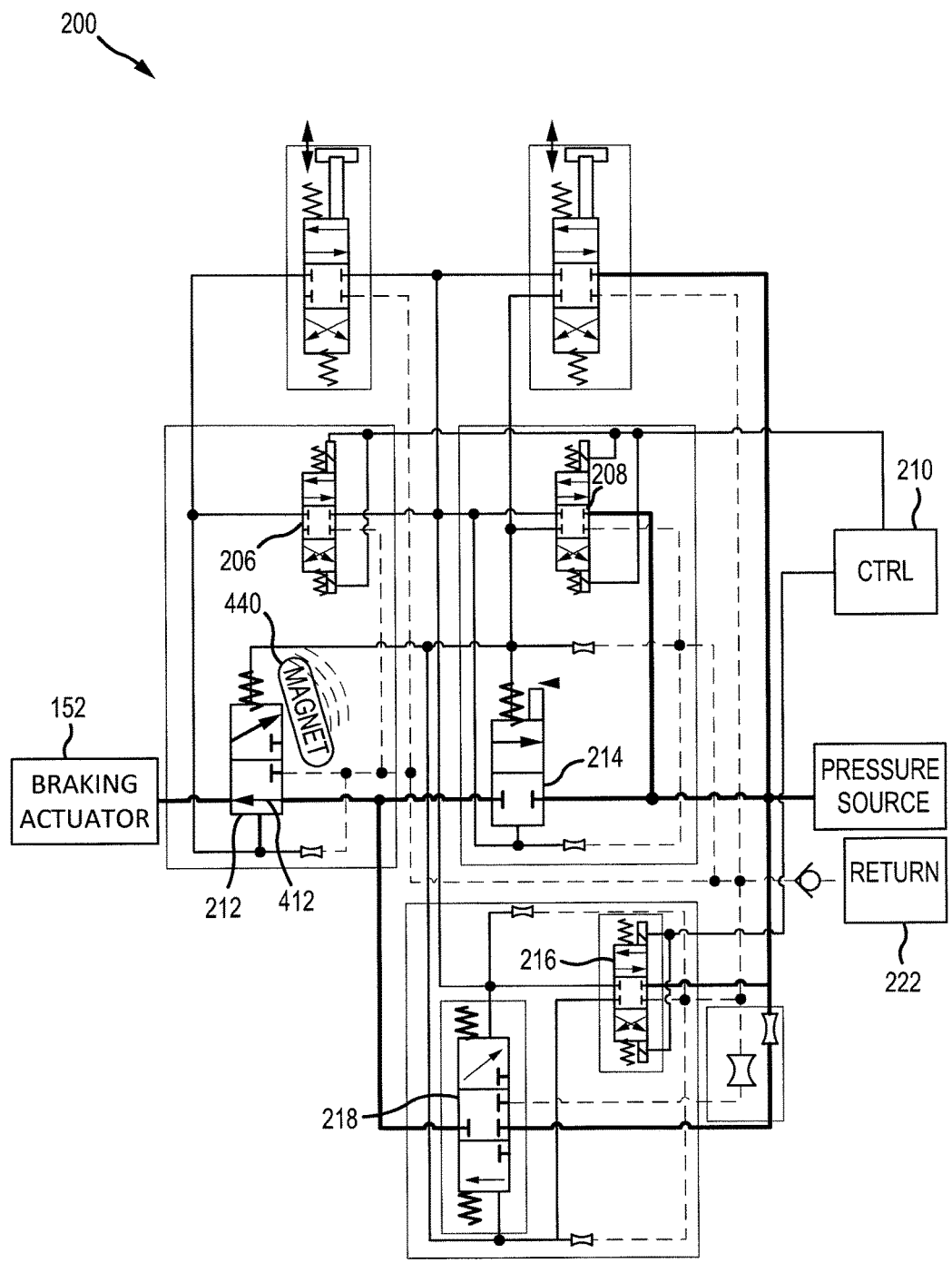
FIG. 14 illustrates the valve of FIG. 2 in response to an electrical request to hold a current emergency braking pressure, and accordance with various embodiments.

In various embodiments and referring to FIGS. 11 and 14, emergency braking pressure may be continuously applied to the braking actuator 152 without control of any valve by the controller 210. In that regard, the controller 210 may cease controlling the electrical park valves 206, 208 and the electrical emergency control valve 216. In that regard, the magnet 440 may cause the first main valve 212 to remain in a position in which fluid between the emergency enable valve 218 and the first main valve 212 may flow through the first main channel 412 to the braking actuator 152. Accordingly, because the pressurized hydraulic fluid positioned between the emergency enable valve 218 and the braking actuator 152 does not have a route to the hydraulic return 222, the hydraulic fluid remains pressurized, thus continuing to apply pressure to the braking actuator 152.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A park and emergency brake valve comprising:
    an electrical park valve configured to receive an electrical park signal and to allow hydraulic fluid to flow through a first electrically-controlled channel in response to the electrical park signal indicating a request to park;
    a main valve configured to receive the hydraulic fluid from the first electrically-controlled channel and to allow the hydraulic fluid to flow to a braking actuator in response to receiving the hydraulic fluid from the first electrically-controlled channel;
    an electrical emergency control valve configured to receive an emergency brake signal and to allow the hydraulic fluid to flow through a first control channel in response to the emergency brake signal indicating a request for emergency braking; and
    an emergency enable valve configured to receive the hydraulic fluid from the first control channel of the electrical emergency control valve and to allow the hydraulic fluid to flow to the braking actuator in response to receiving the hydraulic fluid from the electrical emergency control valve.

2. The park and emergency brake valve of claim 1, further comprising a manual park valve having an actuation lever and configured to allow the hydraulic fluid to flow through a first manually-controlled channel in response to a first movement of the actuation lever, wherein the main valve is further configured to receive the hydraulic fluid from the first manually-controlled channel and to allow the hydraulic fluid to flow to the braking actuator in response to receiving the hydraulic fluid from the first manually-controlled channel.

3. The park and emergency brake valve of claim 2, wherein:
    the manual park valve is configured to allow the hydraulic fluid to flow through a second manually-controlled channel in response to a second movement of the actuation lever, and
    the main valve is further configured to allow the hydraulic fluid to flow from the braking actuator to a return in response to receiving the hydraulic fluid from the second manually-controlled channel.

4. The park and emergency brake valve of claim 1, wherein:
    the electrical park valve is configured to allow the hydraulic fluid to flow through a second electrically-controlled channel in response to the electrical park signal indicating a request to park disengage, and
    the main valve is configured to allow the hydraulic fluid to flow from the braking actuator to a return in response to receiving the hydraulic fluid from the second electrically-controlled channel of the electrical park valve.

5. The park and emergency brake valve of claim 1, wherein the main valve includes a magnet configured to cause the main valve to continue to allow the hydraulic fluid to flow to the braking actuator in response to at least one of:
    a first reduction of the hydraulic fluid flowing through the first electrically-controlled channel of the electrical park valve, or
    a second reduction of the hydraulic fluid flowing through the first control channel of the electrical emergency control valve.

6. The park and emergency brake valve of claim 1, wherein the main valve includes a detent configured to cause the main valve to continue to allow the hydraulic fluid to flow to the braking actuator in response to at least one of:
    a first reduction of the hydraulic fluid flowing through the first electrically-controlled channel of the electrical park valve, or
    a second reduction of the hydraulic fluid flowing through the first control channel of the electrical emergency control valve.

7. The park and emergency brake valve of claim 1, wherein:
    the electrical emergency control valve is further configured to allow the hydraulic fluid to flow through a second control channel in response to the emergency brake signal indicating a request to cease the emergency braking, and
    the emergency enable valve is further configured to allow the hydraulic fluid to flow from the braking actuator to a return in response to receiving the hydraulic fluid from the second control channel of the electrical emergency control valve.

8. The park and emergency brake valve of claim 7, further comprising a brake pressure apply orifice configured to limit a flow of the hydraulic fluid through the emergency enable valve to the braking actuator to a first flow rate.

9. The park and emergency brake valve of claim 8, further comprising a brake pressure release orifice configured to limit a flow of the hydraulic fluid through the emergency enable valve to the return to a second flow rate that is greater than the first flow rate.

10. The park and emergency brake valve of claim 1, wherein the electrical park valve includes a first electrical park valve and a second electrical park valve and the main valve includes a first main valve and a second main valve to provide redundancy of the park and emergency brake valve.

11. A park and emergency brake valve comprising:
a manual park valve having an actuation lever and configured to allow hydraulic fluid to flow through a first manually-controlled channel in response to a first movement of the actuation lever;
a main valve configured to receive the hydraulic fluid from the first manually-controlled channel and to allow the hydraulic fluid to flow to a braking actuator in response to receiving the hydraulic fluid from the first manually-controlled channel;
an electrical emergency control valve configured to receive an emergency brake signal and to allow the hydraulic fluid to flow through a first control channel in response to the emergency brake signal indicating a request for emergency braking; and
an emergency enable valve configured to receive the hydraulic fluid from the first control channel of the electrical emergency control valve and to allow the hydraulic fluid to flow to the braking actuator in response to receiving the hydraulic fluid from the electrical emergency control valve.

12. The park and emergency brake valve of claim 11, wherein:
the manual park valve is configured to allow the hydraulic fluid to flow through a second manually-controlled channel in response to a second movement of the actuation lever, and
the main valve is further configured to allow the hydraulic fluid to flow from the braking actuator to a return in response to receiving the hydraulic fluid from the second manually-controlled channel.

13. The park and emergency brake valve of claim 11, wherein the main valve includes a magnet configured to cause the main valve to continue to allow the hydraulic fluid to flow to the braking actuator in response to at least one of:
a first reduction of the hydraulic fluid flowing through the first manually-controlled channel, or
a second reduction of the hydraulic fluid flowing through the first control channel of the electrical emergency control valve.

14. The park and emergency brake valve of claim 11, wherein the main valve includes a detent configured to cause the main valve to continue to allow the hydraulic fluid to flow to the braking actuator in response to at least one of:
a first reduction of the hydraulic fluid flowing through the first manually-controlled channel, or
a second reduction of the hydraulic fluid flowing through the first control channel of the electrical emergency control valve.

15. The park and emergency brake valve of claim 11, wherein:
the electrical emergency control valve is further configured to allow the hydraulic fluid to flow through a second control channel in response to the emergency brake signal indicating a request to cease the emergency braking, and
the emergency enable valve is further configured to allow the hydraulic fluid to flow from the braking actuator to a return in response to receiving the hydraulic fluid from the second control channel of the electrical emergency control valve.

16. The park and emergency brake valve of claim 15, further comprising a brake pressure apply orifice configured to limit a flow of the hydraulic fluid through the emergency enable valve to the braking actuator to a first flow rate.

17. The park and emergency brake valve of claim 16, further comprising a brake pressure release orifice configured to limit a flow of the hydraulic fluid through the emergency enable valve to the return to a second flow rate that is greater than the first flow rate.

18. A park and emergency brake valve comprising:
a first electrical park valve and a second electrical park valve each configured to receive an electrical park signal and to allow hydraulic fluid to flow through a first electrically-controlled channel in response to the electrical park signal indicating a request to park;
a first manual park valve and a second manual park valve each having an actuation lever and configured to allow the hydraulic fluid to flow through a first manually-controlled channel in response to a first movement of the actuation lever;
a first main valve configured to receive the hydraulic fluid from at least one of the first electrically-controlled channel or the first manually-controlled channel and to allow the hydraulic fluid to flow to a braking actuator in response to receiving the hydraulic fluid from the at least one of the first electrically-controlled channel or the first manually-controlled channel;
an electrical emergency control valve configured to receive an emergency brake signal and to allow the hydraulic fluid to flow through a first control channel in response to the emergency brake signal indicating a request for emergency braking; and
an emergency enable valve configured to receive the hydraulic fluid from the first control channel of the electrical emergency control valve and to allow the hydraulic fluid to flow to the braking actuator in response to receiving the hydraulic fluid from the electrical emergency control valve.

19. The park and emergency brake valve of claim 18, wherein:
the electrical emergency control valve is further configured to allow the hydraulic fluid to flow through a second control channel in response to the emergency brake signal indicating a request to cease the emergency braking, and
the emergency enable valve is further configured to allow the hydraulic fluid to flow from the braking actuator to a return in response to receiving the hydraulic fluid from the second control channel of the electrical emergency control valve.

20. The park and emergency brake valve of claim 19, further comprising:
a brake pressure apply orifice configured to limit a flow of the hydraulic fluid through the emergency enable valve to the braking actuator to a first flow rate; and
a brake pressure release orifice configured to limit a flow of the hydraulic fluid through the emergency enable valve to the return to a second flow rate that is greater than the first flow rate.

* * * * *